US009460284B1

(12) United States Patent
Hajmasan et al.

(10) Patent No.: US 9,460,284 B1
(45) Date of Patent: Oct. 4, 2016

(54) BEHAVIORAL MALWARE DETECTION USING AN INTERPRETER VIRTUAL MACHINE

(71) Applicant: Bitdefender IPR Management Ltd., Nicosia (CY)

(72) Inventors: Gheorghe F. Hajmasan, Lunca Muresului (RO); Sandor Lukacs, Floresti (RO); Botond Fulop, Gheorgheni (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

(21) Appl. No.: 14/738,548

(22) Filed: Jun. 12, 2015

(51) Int. Cl.
*G06F 11/00* (2006.01)
*G06F 21/56* (2013.01)
*G06F 9/455* (2006.01)

(52) U.S. Cl.
CPC ........ *G06F 21/566* (2013.01); *G06F 9/45558* (2013.01); *G06F 2009/45587* (2013.01); *G06F 2009/45591* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 6,021,469 A | * | 2/2000 | Tremblay | G06F 9/30021 711/110 |
| 6,295,643 B1 | * | 9/2001 | Brown | G06F 9/4428 714/E11.212 |
| 2007/0140125 A1 | * | 6/2007 | Pessi | H03M 7/3084 370/236 |
| 2008/0222198 A1 | * | 9/2008 | Wilkinson | G06F 17/30607 |
| 2012/0246487 A1 | * | 9/2012 | Gu | G06F 21/51 713/190 |
| 2012/0290848 A1 | * | 11/2012 | Wang | G06F 9/455 713/188 |
| 2014/0090063 A1 | * | 3/2014 | Calnan | G06F 8/68 726/25 |
| 2014/0317742 A1 | | 10/2014 | Edwards | |
| 2015/0007325 A1 | | 1/2015 | Eliseev et al. | |

OTHER PUBLICATIONS

European Patent Office, International Search Report and Written Opinion Mailed Aug. 8, 2016 for PCT International Application No. PCT/EP2016/062882, international filing date Jun. 7, 2016, priority date Jun. 12, 2015.
Kreibich C. et al., "Policy-controlled Event Management for Distributed Intrusion Detection," 25th IEEE International Conference on Distributed Computing Systems Workshops, p. 385-391, Columbus, OH, USA, Jun. 2005.

* cited by examiner

*Primary Examiner* — Dede Zecher
*Assistant Examiner* — Trang Doan
(74) *Attorney, Agent, or Firm* — Law Office of Andrei D Popovici, PC (57) ABSTRACT

Described systems and methods allow protecting a computer system from computer security threats such as malware and spyware. In some embodiments, a security application executes a set of detection routines to determine whether a set of monitored entities (processes, threads, etc.) executing on the computer system comprise malicious software. The detection routines are formulated in bytecode and executed within a bytecode translation virtual machine. Execution of a detection routine comprises translating bytecode instructions of the respective routine into native processor instructions, for instance via interpretation or just-in-time compilation. Execution of the respective routines is triggered selectively, due to the occurrence of specific events within the protected client system. Detection routines may output a set of scores, which may be further used by the security application to determine whether a monitored entity is malicious.

20 Claims, 8 Drawing Sheets

BEHAVIORAL MALWARE DETECTION USING AN INTERPRETER VIRTUAL MACHINE

BACKGROUND

The invention relates to systems and methods for protecting computer systems from malware.

Malicious software, also known as malware, affects a great number of computer systems worldwide. In its many forms such as computer viruses, worms, rootkits, unsolicited adware, ransomware, and spyware, malware presents a serious risk to millions of computer users, making them vulnerable to loss of data and sensitive information, identity theft, and loss of productivity, among others. Malware may further display material that is considered by some users to be obscene, excessively violent, harassing, or otherwise objectionable.

Security software may be used to detect malware infecting a user's computer system, and additionally to remove or otherwise incapacitate such malware. Several malware-detection techniques are known in the art. Some rely on matching a fragment of code of the malware agent to a library of malware-indicative signatures. Other conventional methods detect a set of malware-indicative behaviors of the malware agent.

Malware evolves quickly, so as to stay ahead of detection algorithms. To address such rapidly changing threats, providers of security software typically adjust detection methods and/or parameters on the scale of minutes to hours, for instance by re-training classifiers to detect new malware versions. Typically, such re-training is computationally costly. Moreover, the introduction of a new behavioral detection algorithm, or even changing an existing one, typically require extensive testing as well as a re-compilation of the source code of the respective security software. Only then can the new software version be delivered to clients, for instance as a software update. In contrast, in signature-based detection systems, a new malware signature can be easily added to an existing set of signatures.

Therefore, there is a strong interest in developing anti-malware solutions capable of swiftly updating algorithms and/or parameters, to keep pace with the ever-changing nature of malware.

SUMMARY

According to one aspect, a client system comprises at least one hardware processor configured to form a routine dispatcher, a bytecode translation virtual machine, and a behavioral assessment engine. The routine dispatcher is configured, in response to detecting an occurrence of a trigger event, to select an anti-malware bytecode routine for execution from a plurality of anti-malware bytecode routines, the anti-malware bytecode routine selected according to the trigger event. The occurrence of the trigger event is caused by a monitored process executing within the client system. The bytecode translation virtual machine is configured to execute the anti-malware bytecode routine to determine whether the occurrence of the trigger event is indicative of malware, wherein executing the anti-malware bytecode routine comprises translating a set of bytecode instructions of the anti-malware bytecode routine into a sequence of native processor instructions, and executing the sequence of native processor instructions. The behavioral assessment engine is configured to determine whether the client system comprises malware according to a result of the bytecode translation virtual machine executing the anti-malware bytecode routine.

According to another aspect, a computer-implemented method comprises employing at least one hardware processor of a client system, in response to detecting an occurrence of a trigger event, to select an anti-malware bytecode routine from a plurality of bytecode routines according to the trigger event, the anti-malware bytecode routine configured to determine whether the occurrence of the trigger event is indicative of malware. The trigger event is caused by a monitored process executing within the client system. The method further comprises employing at least one hardware processor of the client system, in response to selecting the anti-malware bytecode routine, to translate a set of bytecode instructions of the anti-malware bytecode routine into a sequence of native processor instructions, and to execute the sequence of native processor instructions. The method further comprises employing at least one hardware processor of the client system to determine whether the client system comprises malware according to a result of executing the sequence of native processor instructions.

According to another aspect, a non-transitory computer-readable medium stores a computer program which, when executed by at least one hardware processor of a client system, cause the client system to form a routine dispatcher, a bytecode translation virtual machine, and a behavioral assessment engine. The routine dispatcher is configured, in response to detecting an occurrence of a trigger event, to select an anti-malware bytecode routine for execution from a plurality of anti-malware bytecode routines according to the trigger event, the anti-malware bytecode routine configured to determine whether the occurrence of the trigger event is indicative of malware. The trigger event is caused by a monitored process executing within the client system. The bytecode translation virtual machine is configured to execute the anti-malware bytecode routine, wherein executing the anti-malware bytecode routine comprises translating a set of bytecode instructions of the anti-malware bytecode routine into a sequence of native processor instructions, and executing the sequence of native processor instructions. The behavioral assessment engine is configured to determine whether the client system comprises malware according to a result of the bytecode translation virtual machine executing the anti-malware bytecode routine.

According to another aspect, a non-transitory computer-readable medium stores an anti-malware bytecode routine, the anti-malware bytecode routine executable by a bytecode translation virtual machine formed on a client system comprising at least one hardware processor, wherein executing the anti-malware bytecode routine causes the at least one hardware processor to determine whether an occurrence of a trigger event within the client system is indicative of malware. Executing the anti-malware bytecode routine comprises translating a set of bytecode instructions of the anti-malware bytecode routine into a sequence of native processor instructions, and executing the sequence of native processor instructions. The client system further comprises a routine dispatcher and a behavioral assessment engine. The routine dispatcher is configured, in response to detecting the occurrence of the trigger event, to select the anti-malware bytecode routine from the plurality of bytecode routines according to the trigger event. The behavioral assessment engine is configured to determine whether the client system comprises malware according to a result of the bytecode translation virtual machine executing the anti-malware bytecode routine.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer security encompasses protecting users and equipment against unintended or unauthorized access to data and/or hardware, against unintended or unauthorized modification of data and/or hardware, and against destruction of data and/or hardware. A computer program is a sequence of processor instructions carrying out a task. Computer programs described in some embodiments of the present invention may be stand-alone software entities or sub-entities (e.g., subroutines, libraries) of other computer programs. Unless otherwise specified, a process is an instance of a computer program, such as an application or a part of an operating system, and is characterized by having at least an execution thread and a virtual memory space assigned to it, wherein a content of the respective virtual memory space includes executable code. The term platform is used to denote a specific physical or virtualized hardware configuration (e.g., comprising a specific model or family of processors). A virtual platform comprises virtualized hardware, for instance a virtualized processor. The term bytecode herein refers to a multiple-platform encoding of a computer program, in the sense that bytecode instructions may be delivered in identical form to different platforms. In contrast to bytecode instructions, native processor instructions comprise instructions of an instruction set architecture (ISA) specific to the physical or virtual platform that executes the respective native processor instructions. Computer readable media encompass non-transitory media such as magnetic, optic, and semiconductor storage media (e.g. hard drives, optical disks, flash memory, DRAM), as well as communication links such as conductive cables and fiber optic links According to some embodiments, the present invention provides, inter alia, computer systems comprising hardware (e.g. one or more microprocessors) programmed to perform the methods described herein, as well as computer-readable media encoding instructions to perform the methods described herein.

The following description illustrates embodiments of the invention by way of example and not necessarily by way of limitation.

Figure 1:
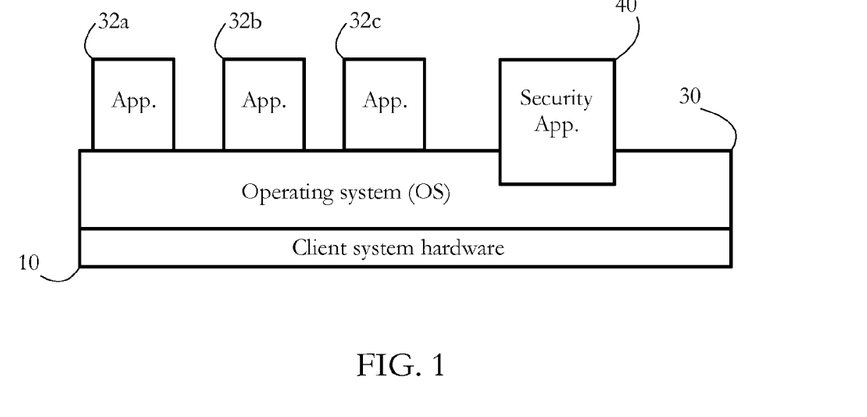
FIG. 1 shows an exemplary client system protected against computer security threats (e.g., malware) according to some embodiments of the present invention.

FIG. 1 shows an exemplary set of software objects executing on a client system 10 protected from computer security threats according to some embodiments of the present invention. Client system 10 may represent a computer system (e.g., an end-user computer, a corporate server, etc.). Other exemplary client systems 10 include mobile computing devices (e.g., laptops, tablet PC's), telecommunication devices (e.g., smartphones), digital entertainment appliances (TV's, game consoles, etc.), wearable computing devices (e.g., smartwatches), or any other electronic device having a processor and a memory, and requiring computer security protection.

In some embodiments, an operating system (OS) 30 comprises software that provides an interface to the hardware of client system 10, and acts as a host for a set of software applications 32a-c and 40. OS 30 may comprise any widely available operating system such as Windows®, MacOS®, Linux®, iOS®, or Android®, among others. Applications 32a-c generically represent user software, which may include, for example, word processing, image processing, database, browser, and electronic communication applications, among others. In some embodiments, a security application 40 executes concurrently with applications 32a-c and is configured to determine whether any software executing on client system 10 (including applications 32a-c and OS 30) poses a computer security threat. For instance, application 40 may detect malware (e.g., viruses, spyware, adware, etc.) operating on client system 10. Application 40 may be further configured to erase or otherwise incapacitate such malicious software, and to alert a user of client system 10 or a system administrator. Security application 40 may be a standalone program, or may form part of a software suite comprising, among others, anti-malware, anti-spam, and anti-fraud components. The operation of security application 40 is described in detail below.

Figure 2:
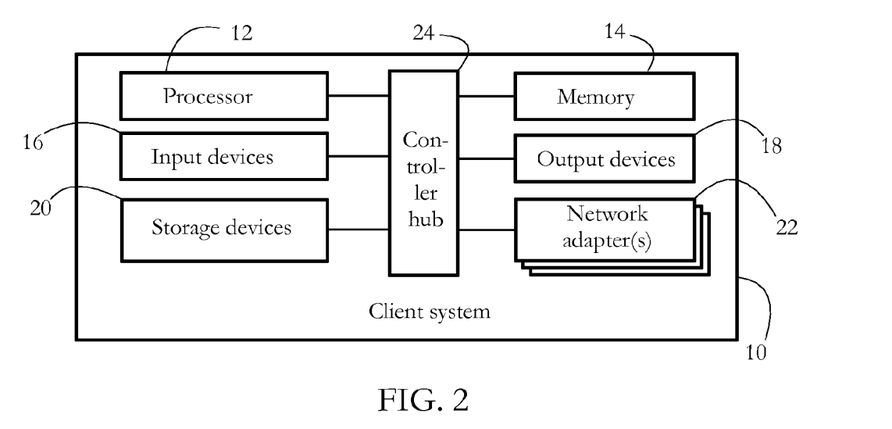
FIG. 2 shows an exemplary hardware configuration of a client computer system according to some embodiments of the present invention.

FIG. 2 illustrates an exemplary hardware configuration of client system 10, wherein client system 10 is a computer system. A skilled artisan will appreciate that the hardware configuration of other devices such as tablet PCs, mobile telephones, smartwatches, etc., may differ from the illustrated configuration, but that the present description may be adapted to such devices. Client system 10 comprises a set of physical devices, including a hardware processor 12, a memory unit 14, a set of input devices 16, a set of output devices 18, a set of storage devices 20, and a set of network adapters 22, all inter-connected by a controller hub 24.

In some embodiments, processor 12 comprises a physical device (e.g. microprocessor, multi-core integrated circuit formed on a semiconductor substrate) configured to execute computational and/or logical operations with a set of signals and/or data. In some embodiments, such logical operations are transmitted to processor 12 from memory unit 14, in the form of a sequence of processor instructions (e.g. machine code or other type of software). Memory unit 14 may comprise volatile computer-readable media (e.g. RAM) storing data/signals accessed or generated by processor 12 in the course of carrying out instructions. Input devices 16 may include computer keyboards, mice, and microphones, among others, including the respective hardware interfaces and/or adapters allowing a user to introduce data and/or instructions into client system 10. Output devices 18 may include display devices such as monitors and speakers, among others, as well as hardware interfaces/adapters such as graphic cards, allowing client system 10 to communicate data to a user. In some embodiments, input devices 16 and output devices 18 may share a common piece of hardware, as in the case of touch-screen devices. Storage devices 20 include computer-readable media enabling the non-volatile storage, reading, and writing of processor instructions and/or data. Exemplary storage devices 20 include magnetic and optical disks and flash memory devices, as well as removable media such as CD and/or DVD disks and drives. The set of network adapters 22 enables client system 10 to connect to a network (e.g., a local area network, wireless network, etc.) and/or to other devices/computer systems. Controller hub 24 generically represents the plurality of system, peripheral, and/or chipset buses, and/or all other circuitry enabling the communication between processor 12 and devices 14, 16, 18, 20 and 22. For instance, controller hub 22 may comprise a northbridge connecting processor 12 to memory 14, and/or a southbridge connecting processor 12 to devices 16, 18, 20 and 22.

In some embodiments, client system 10 is configured to operate a virtual platform (e.g., a virtual machine). Such configurations may be set up using hardware virtualization technology, for instance a hypervisor. The virtual platform may comprise virtualized hardware components, each such virtualized component emulating, at least in part, the functionality of a corresponding hardware component of client system 10. For instance, a virtual platform may include a virtualized processor, a virtualized memory unit, and virtual input/output devices. Operating system 30, as well as applications 32a-c and security application 40, may execute on the respective virtual platform, interacting with the virtualized hardware. Software is said to execute on a virtual platform when it employs a virtualized processor of the respective platform for execution.

Figure 3:
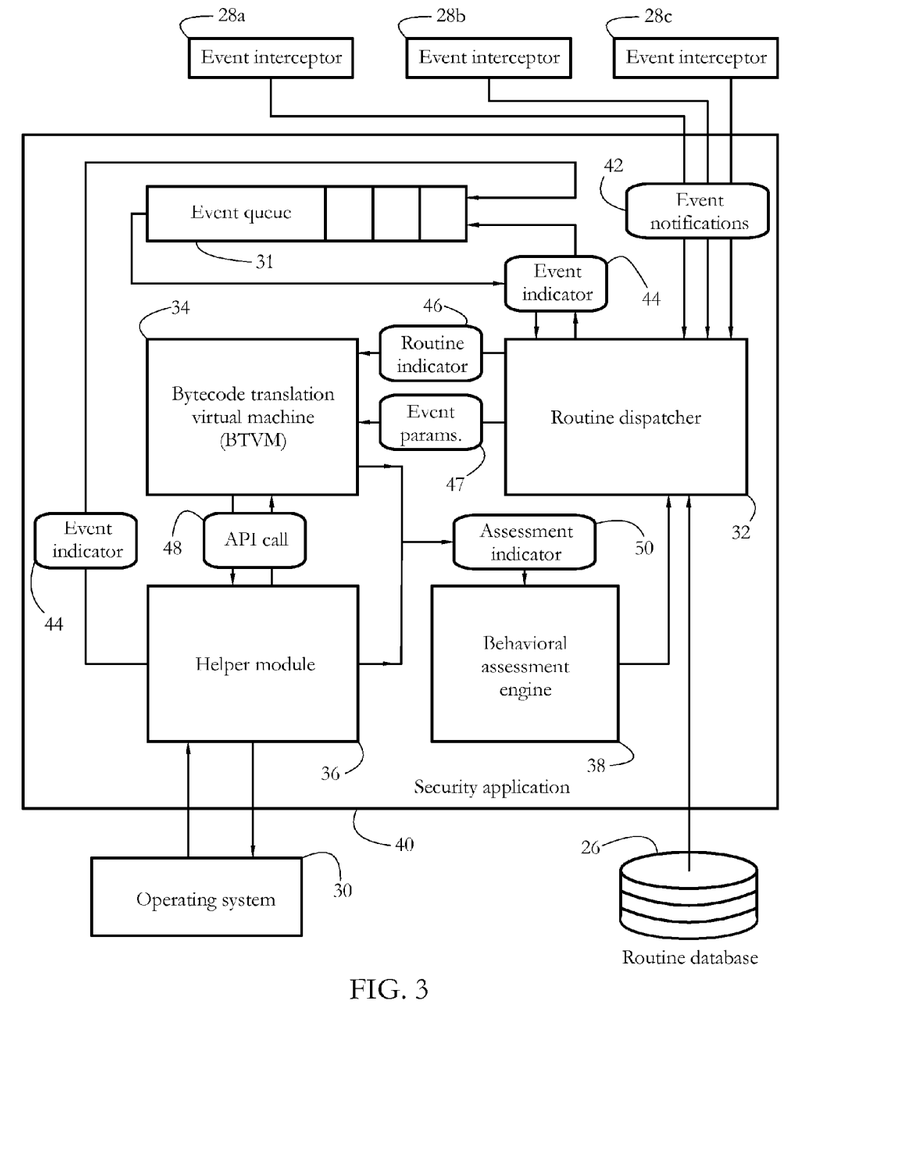
FIG. 3 illustrates an exemplary structure of a security application according to some embodiments of the present invention.

FIG. 3 shows exemplary components of security application 40 according to some embodiments of the present invention. Security application 40 comprises a routine dispatcher 32, a behavioral assessment engine 38 and a bytecode translation virtual machine (BTVM) 34 connected to dispatcher 32 and assessment engine 38. In some embodiments, application 40 further comprises a helper module 36 connected to BTVM 34 and/or to assessment engine 38. Routine dispatcher 32 may further manage an event queue 31, as detailed further below.

In some embodiments, routine dispatcher 32 receives a set of event notifications 42 from a set of event interceptors 28a-c installed within various software objects executing on client system 10. Event notifications 42 may thus inform dispatcher 32 about the occurrence of various events during execution of software. Exemplary notified events may include, among others, the creation of a process or thread, code injection, a system call, an attempt to create a new disk file, an attempt to write to an existing disk file, an attempt to edit a system register key, and an attempt to write to a particular memory section. Some of the notified events may be malware-indicative. Other events may not be themselves indicative of a security threat, but may signal a potential threat when occurring together with other events. In response to receiving notification(s) 42, some embodiments of dispatcher 32 may select a bytecode routine according to details of notification 42, and send the respective bytecode routine to bytecode translation VM 34 for execution, together with a set of event parameters 47 of the notified event. Execution of the respective bytecode routine may supply an assessment indicator 50 to behavioral assessment engine 38. Engine 38 may maintain a plurality of such assessment indicators (e.g., scores), and may raise an alert when at least one such indicator indicates a computer security threat. The operation of components 32, 34, and 38 is described in detail below.

Figure 4:
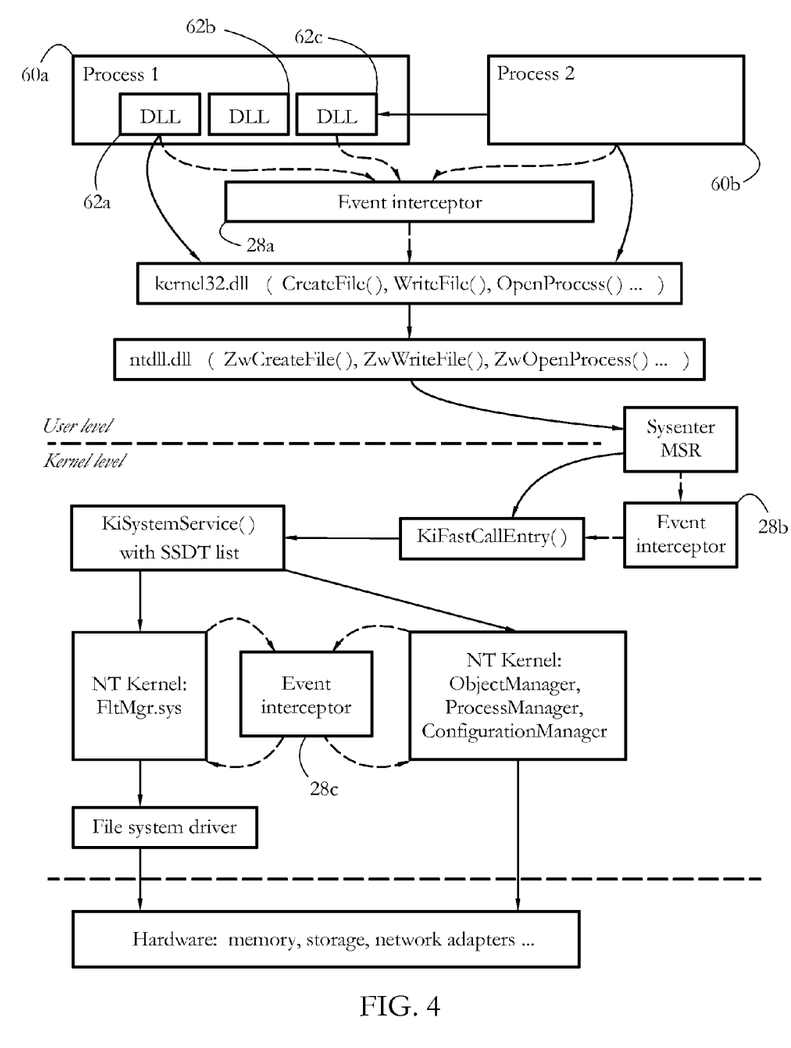
FIG. 4 illustrates an exemplary execution flow of a set of processes in a Windows® environment. Solid arrows indicate the flow in the absence of event interceptors. Dashed arrows indicate modifications to the execution flow, the modifications introduced by a plurality of event interceptors operating according to some embodiments of the present invention.

To illustrate the operation of event interceptors 28a-c, FIG. 4 shows an exemplary execution flow of a set of software entities 60a-b according to some embodiments of the present invention. For simplicity, the chosen entities 60a-b are processes executing in an instance of a Windows® OS; similar diagrams may be rendered for other operating systems such as Linux, for example. Solid arrows represent the execution flow in the absence of event interceptors. Dashed arrows represent modifications to the flow due to the presence of event interceptors 28a-c executing according to some embodiments of the present invention.

Exemplary process 60a loads a plurality of dynamic-linked libraries (DLLs) 62a-c; in the example of FIG. 4, DLL 62c is injected into process 60a by (possibly malicious) process 60b. When process 60a (or one of its loaded DLLs) executes an instruction calling for some system functionality, e.g. to write something to a disk file, or to edit a registry key, the respective instruction calls a user-mode API such as KERNEL32.DLL or NTDLL.DLL. In the example of FIG. 4, the respective user-mode API call is intercepted by a user-level event interceptor 28a. Such interceptions may be achieved by a method such as DLL injection or hooking, among others. Hooking is a generic term used in the art for a method of intercepting function calls, messages, or events passed between software components. One exemplary hooking method comprises altering the entry point of a target function, by inserting an instruction (in this case, event interceptor 28a) redirecting execution to a second function. Following such hooking, the second function may be executed instead, or before, the target function. In the example of FIG. 4, security application 40 may hook into certain functions of the KERNEL32.DLL and/or NTDLL.DLL libraries, to instruct the respective functions to redirect execution to a component of application 40. Thus, application 40 may be notified whenever process 60a is attempting to perform a particular action, identified according to the hooked function.

In a typical flow of execution, the user-mode API function called by entity 60a may request service from the operating system's kernel. In some embodiments, such operations are carried out by issuing a system call, such as SYSCALL and SYSENTER on x86 platforms. In the example of FIG. 4, such system calls are intercepted by event interceptor 28b. In some embodiments, such interception comprises, for instance, modifying a system call handler routine by changing a value stored in a model-specific register (MSR) of processor 12, which effectively redirects execution of the respective handler routine to interceptor 28b or directly to a component of application 40. Such techniques are known in the art as MSR hooking, and may allow security application 40 to be notified whenever a software entity is attempting to perform certain system calls.

Following the system call, control of the processor is typically turned over to the kernel of OS 30. In some embodiments, a kernel-level event interceptor 28c is configured to intercept certain actions of the OS kernel, and therefore determine that the evaluated process is attempting to perform certain operations, which may be malware-indicative. To intercept such actions, some embodiments may employ a set of filtering mechanisms built into and exposed by OS 30. For example, in a Windows® OS, FltRegisterFilter may be used to intercept operations like creating, opening, writing to, and deleting a file. In another example, event interceptor 28c may use ObRegisterCallback to intercept create or duplicate object-handle operations, or PsSetCreateProcessNotifyRoutine to intercept the creation of new processes. In yet another example, Windows registry operations such as creating and setting registry keys/values may be intercepted using CmRegisterCallbackEx. Similar event filtering mechanisms are known in the art for other operating systems such as Linux®. In response to detecting the occurrence of a particular event/action, event interceptor 28 may transmit notification(s) 42 to security application 40.

Figure 5:
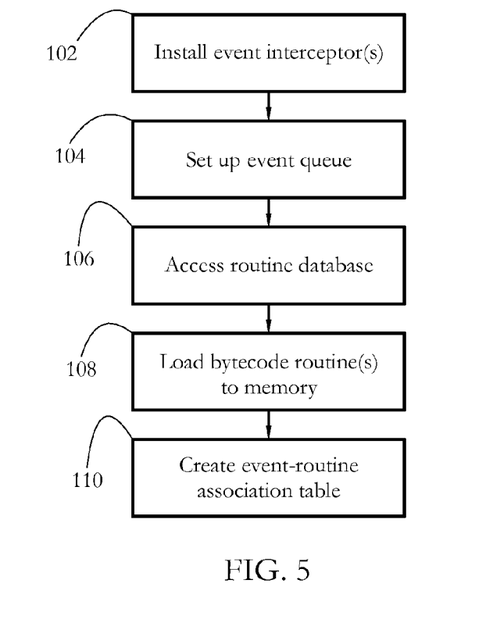
FIG. 5 shows an exemplary sequence of steps performed by the security application to configure malware detection according to some embodiments of the present invention.

FIG. 5 shows an exemplary sequence of steps performed by security application 40 to set up detection of computer security threats according to some embodiments of the present invention. The illustrated sequence of steps may be executed, for instance, when security application 40 is launched. In a step 102, application 40 installs event interceptors 28a-c, for instance by hooking various functions of OS 30, modifying an entry of a dispatch table, etc. Various methods for installing such interceptors are known in the art (e.g., patching, MSR hooking, code injection, etc.). A step 104 sets up event queue 31, used by some embodiments of routine dispatcher to store information about notified events and the order in which such events have occurred. In some embodiments, event queue 31 is organized as a first-in-first-out (FIFO) queue. An exemplary queue 31 may be a simple-linked, lockless, multi-producer, multi-consumer queue.

A sequence of steps 106-108 accesses a routine database 26 (see e.g., FIG. 3) and loads a set of bytecode routines from database 26 into a section of memory. Database 26 may reside on storage devices 20 of client system 10 or on computer-readable media communicatively coupled to client system 10.

In some embodiments, each bytecode routine stored in database 26 comprises a set of bytecode instructions, which, when executed by BTVM 34, cause BTVM 34 to carry out a specific task related to computer security. One exemplary bytecode routine applies a set of heuristic tests to determine whether a particular software object (or group of objects) is malicious. Another example of bytecode routine checks for the occurrence of a particular sequence of events (a behavioral signature) on client system 10. Not all events of the sequence need to be caused by the same entity. However, the occurrence of such a sequence of events may be malware-indicative. In one such example, malicious activities are divided among a group of entities, each member of the group carrying out a small part of the malicious activities. A bytecode routine configured to correlate events corresponding to such distributed activities may therefore detect a whole group of malicious entities.

Other exemplary bytecode routines perform bookkeeping and/or statistical tasks (e.g. counting events, relating event parameters). Other bytecode routines may alter the manner in which software and/or a user of client system 10 interacts with OS 30 and/or hardware devices (e.g., a routine may prevent a software object from writing to the disk or from accessing network adapters 22). Each bytecode routine may embody a distinct detection method and/or heuristic. In some embodiments, each bytecode routine may be configured to detect the presence of a particular category, family, type, or variant of malicious agent. Several distinct routines may collaborate in detecting a single category, family, type, or variant of malicious agent. In some embodiments, a single routine may participate in detecting several categories, types, families, or variants of malware.

Figure 6:
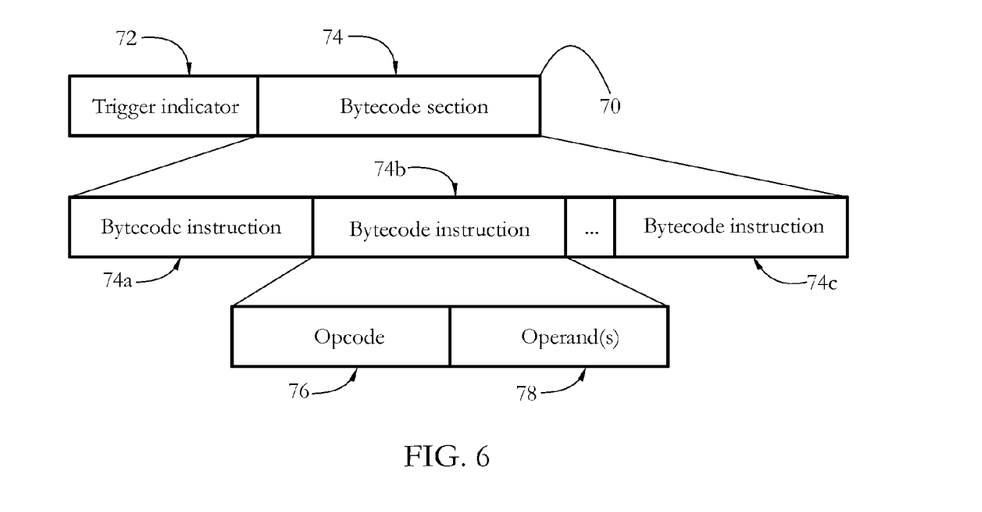
FIG. 6 shows an exemplary bytecode routine according to some embodiments of the present invention.

FIG. 6 shows an exemplary bytecode routine 70 according to some embodiments of the present invention. Routine 70 comprises a trigger indicator 72 and a bytecode section 74. In some embodiments, trigger indicator 72 encodes one or more conditions for executing the respective bytecode routine. The respective condition(s) may be evaluated by routine dispatcher 32 and/or BTVM 34 in order to determine whether the respective bytecode routine should be executed in response to detecting the occurrence of a particular type of event. An exemplary condition requires determining whether a particular trigger expression evaluates to either TRUE or FALSE, and determining that the condition is satisfied when the expression is TRUE. In some embodiments, the respective trigger expression comprises an indicator of an event type (e.g., process creation, a specific system call, etc.). The trigger expression may further comprise event parameters, such as a path, a filename, a process ID, etc. In some embodiments, trigger expressions may comprise variables used by BTVM 34 and/or routine dispatcher 32 (see example below).

Trigger indicator 72 may further comprise a flag indicating whether the respective routine/bytecode section should be executed in a synchronous or asynchronous manner. The term synchronous is used herein to denote a manner of executing a bytecode routine wherein execution of the process generating the event that triggered execution of the respective routine (herein deemed triggering process, for simplicity) is suspended while the respective routine is executed. Some embodiments use a thread execution context of the triggering process to execute the respective bytecode routine, which implicitly suspends execution of the triggering process, or at least of a thread of the respective process, for the duration of execution of the routine. The suspension and/or resumption of execution of the triggering process may be effected by the interceptor of the respective event. For instance, interceptor 28a-c may hijack the thread of the triggering process, and/or resume execution of the triggering process only in response to a signal from routine dispatcher 32. In contrast to synchronous execution, asynchronous execution refers to a manner of executing a bytecode routine wherein the triggering process is allowed to continue execution, while the event that triggered the notification is inserted into an event queue for later processing. Having a synchrony flag associated to each routine or bytecode section may help routine dispatcher 32 to determine how to handle event notifications (further details are given below).

In some embodiments, bytecode section 74 comprises a succession of bytecode instructions 74a-c instructing BTVM 34 to perform the computer security task associated with routine 70. In some embodiments, each bytecode instruction is a native instruction of a virtual processor of BTVM 34. In an exemplary embodiment, BTVM 34 is a Java® virtual machine, and bytecode instructions 74a-c are instructions of the Java® language. In order for a bytecode instruction to be executed by hardware processor 12, the respective bytecode instruction is first translated (interpreted or compiled) into a sequence of native processor instructions, e.g. into instructions of an instruction set architecture (ISA) of processor 12. Such translations are carried out, at least in part, by BTVM 34. When security application 40 executes on a virtual platform, BTVM 34 may translate each bytecode instruction into a sequence of processor instructions native to the virtual processor of the respective virtual platform.

An exemplary bytecode instruction set may comprise, among others, bytecode instructions for setting values, comparing values, performing jumps, loop instructions, and instructions for calling external functions (such as functions of helper module 36 in FIG. 3). In some embodiments, each bytecode instruction includes an opcode field 76 indicative of an operation, and an operand field 78 indicative of at least one operand.

Some bytecode routines may have a plurality of sections, wherein each section may have a distinct trigger indicator. In such configurations, each section of the routine may be triggered by a distinct condition. In one such example, bytecode routine 70 may be targeted at detecting ransomware, i.e., malicious software which encrypts a user's files and asks that the user pay a ransom before decrypting the respective files. Examples of ransomware include CryptoWall, CryptoLocker, and CTB-Locker malware, among others. Such malware typically call an encryption API, enumerate the user's files, and display a ransom message. An exemplary bytecode routine detecting such malware may include four sections:

| | |
|---|---|
| Section 1: | Trigger: EventType = call to a cryptographic function<br>Output: set static variable CryptoAPICall = TRUE |
| Section 2: | Trigger: [EventType = enumerate files using FindFirstFile<br>API and CryptoAPICall = TRUE]<br>Do: Check file extension of enumerated files<br>Output: set static variable RansomDocSearch = TRUE<br>if enumerated files have extensions PDF, DOCX, JPG, . . . |
| Section 3: | Trigger: [EventType = attempt to write to a disk file and<br>RansomDocSearch = TRUE]<br>Do: determine whether file is among enumerated files<br>Output: set RansomActivity = TRUE and increase<br>evaluation score by 30 points |
| Section 4: | Trigger: [EventType = change of screen background and<br>RansomActivity = TRUE]<br>Output: increase evaluation score by 20 points |

In the example above, Section 2 can execute only when Section 1 has executed at least once, Section 3 will can execute only when Section 2 has executed, etc.

In some embodiments, each bytecode routine further comprises an initialization section, a cleanup section, and an error section. The initialization section may comprise variable initializations and may be executed once, when the respective bytecode routine is loaded into memory (e.g., at step 108 in FIG. 5). The cleanup section may be executed upon termination of the respective routine. The error section may comprise instructions executed in case an error occurs during execution of any other section of the respective bytecode routine.

In some embodiments, in a step 110 (FIG. 5), security application 40 may parse the loaded bytecode routines and create an association indicator (e.g., a table or a hash index) indicating an association between event types and bytecode routines triggered by the respective event types. Such an association enables routine dispatcher 32 to select routines for execution in response to detecting the occurrence of certain events.

Figure 7:
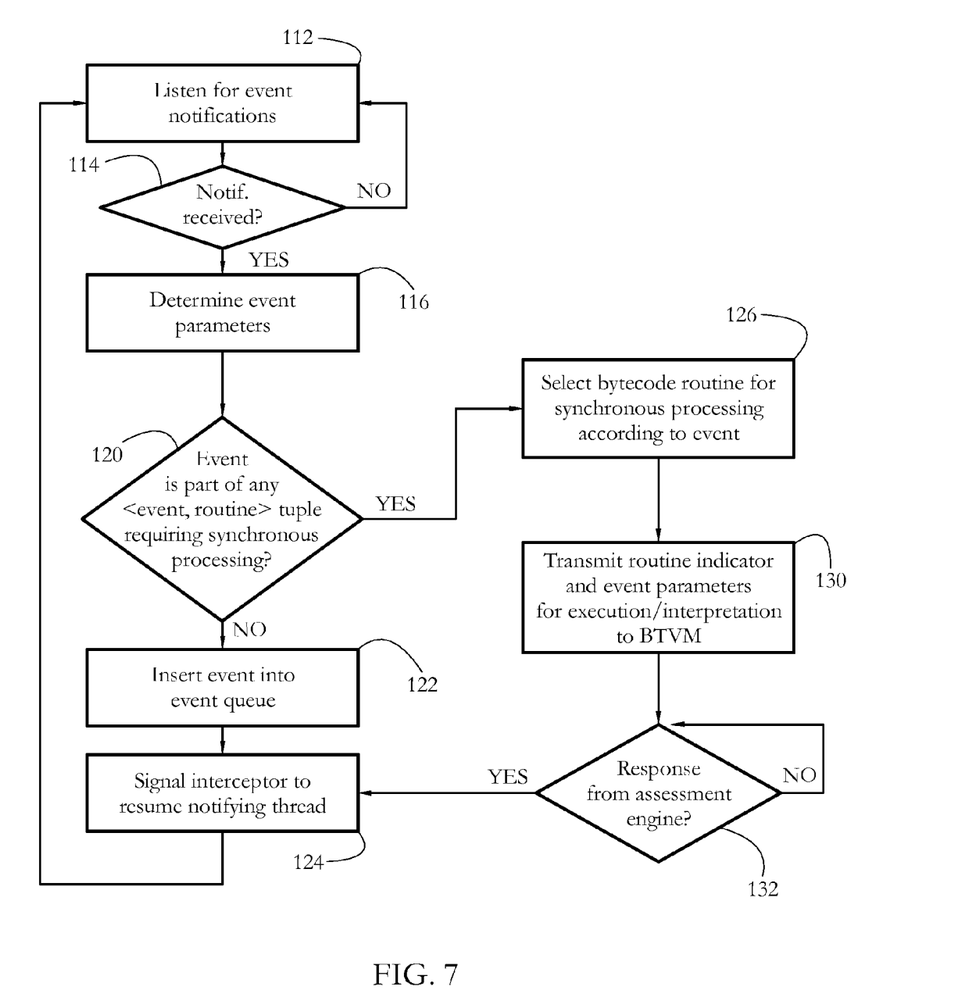
FIG. 7 illustrates an exemplary sequence of steps performed by the routine dispatcher (FIG. 3) according to some embodiments of the present invention.

FIG. 7 shows an exemplary sequence of steps performed by routine dispatcher 32 according to some embodiments of the present invention. A sequence of steps 112-114 listens for event notifications from interceptors 28a-c. In response to receiving event notification 42, a step 116 determines a set of event parameters 47 of the respective notified event. Such parameters may be event-specific. Some exemplary event parameters include, among others, an identifier of a process or thread (e.g., process ID) performing the notified action, a filename, a path, a memory address, and an operand of a processor instruction. Event parameters may be determined by interceptors 28a-c and included in event notification 42, or may be determined by routine dispatcher 32 in response to receiving notification 42. In one example wherein the notified event is an attempt to create a new disk file, event parameters may include the name of the file being created. The respective filename may be determined by the event interceptor and transmitted to routine dispatcher 32 as part of notification 42. In another example, the identity of a process performing a particular action may be determined directly by routine dispatcher 32, for instance by parsing a data structure used by OS 30 to manage processes currently in execution. In the Windows® OS, each process is represented as an executive process block (EPROCESS), which comprises, among others, handles to each of the threads of the respective process, and a unique process ID allowing OS 30 to identify the respective process from a plurality of executing processes. Similar process/thread representations are available for other OSs, such as Linux.

The occurrence of certain events may require the synchronous execution of an associated bytecode routine. Examples of such events include, among others, events with substantial and/or irreversible consequences for the respective client system, such as the termination of a process, deletion of a file, and deletion of a registry key. To manage synchronous execution, some embodiments of routine dispatcher 32 may maintain a list of <event, routine> tuples, wherein each tuple indicates that the respective routine should be executed synchronously in response to an occurrence of the respective event. Such tuples may be static, e.g., some routines (or sections of a routine) are necessarily executed in a synchronous manner every time the respective trigger occurs. Static tuples may be identified, for instance, according to a value of a synchrony flag associated to the respective routine/section (see above). Other <event, routine> tuples may be situational, i.e., may be in effect only in certain circumstances. Such tuples may be dynamically added and/or removed from the list, for instance in response to the occurrence of other events, etc. In some embodiments, the list of <event, routine> tuples registered for synchronous processing may vary according to a set of options indicated by a user (e.g., administrator) of the respective client system.

In general, synchronous processing/execution of bytecode routines may offer higher security, but may negatively impact the user experience by slowing down some tasks. Different users may prefer different security settings. In some embodiments, each setting (e.g, desired security level) may correspond to a distinct composition of the <event, routine> list.

In a step 120, routine dispatcher 32 determines whether the occurrence of the triggering event indicated by the current event notification warrants synchronous processing, for instance by determining whether there is at least one <event, routine> tuple comprising the respective event. The determination in step 120 may further proceed according to the type of the respective event, according to a synchrony flag of notification 42, or according to a trigger indicator of a bytecode routine.

When the occurrence of the respective event does not require synchronous processing, in a step 122, routine dispatcher 32 inserts the respective event into event queue 31. A further step 124 signals to interceptor(s) 28*a-c* to resume execution of the process/thread causing the respective event notification.

When the occurrence of the currently notified event requires synchronous processing, in a step 126, routine dispatcher 32 selects a bytecode routine according to the respective event. Step 126 may include identifying a subset of bytecode routines associated to the type of current event, and evaluating trigger conditions of each such routine. A step 130 comprises launching an instance of BTVM 34 instantiated with the respective bytecode routine. Some embodiments use the execution thread of the triggering process to execute the respective instance of BTVM 34. When step 126 identifies more than one bytecode routine triggered by the current event notification, the sequence of steps 128-130 may be re-executed for each such routine.

In some embodiments, in a step 132, routine dispatcher 32 waits for a response from behavioral assessment engine 38 and/or BTVM 34 indicating a result of a security assessment of the process causing notification 42. The assessment may indicate, for instance, whether the respective process is malicious. In an alternative embodiment, in step 132 dispatcher 32 may wait until the BTVM 34 has finished executing the current bytecode routine. When the respective routine has finished executing and/or the security assessment is complete, dispatcher 32 may signal to event interceptor(s) 28*a-c* to resume execution of the process causing event notification 42.

Figure 8:
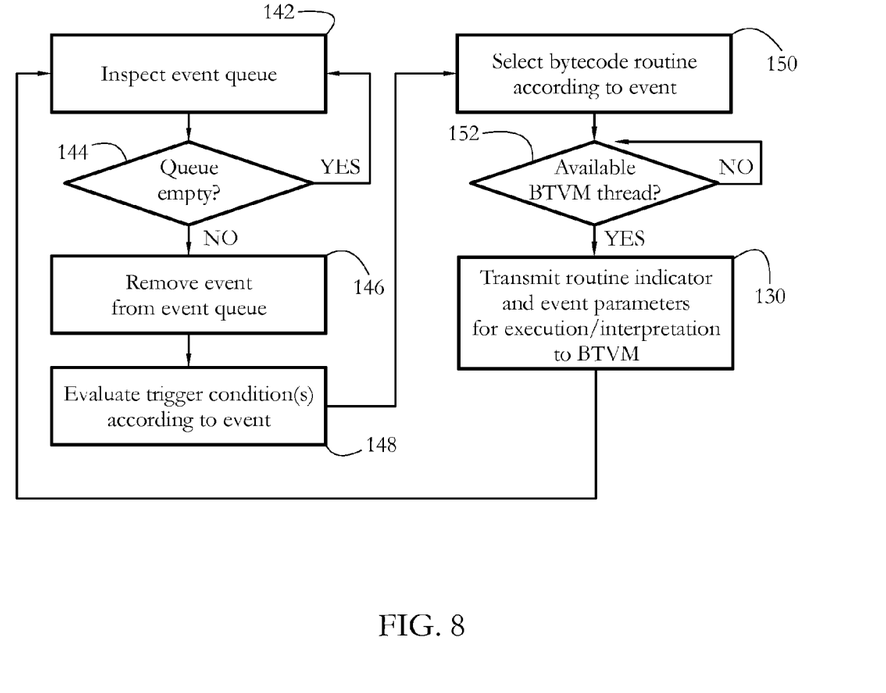
FIG. 8 shows an exemplary sequence of steps performed by the routine dispatcher to process an event queue according to some embodiments of the present invention.

FIG. 8 illustrates an exemplary sequence of steps carried out by routine dispatcher 32 to process event queue 31 according to some embodiments of the present invention. A sequence of steps 142-144 wait until queue 31 contains at least one item. A step 146 removes an event from the queue. When queue 31 is of the FIFO type, events are removed in the order they were inserted. In a step 148, routine dispatcher 32 evaluates trigger conditions according to the type and/or parameters of the event, to identify a subset of bytecode routines triggered by the respective event. In a sequence of steps 150-152-154, dispatcher 32 selects each such routine and sends it for execution to BTVM 34.

Figure 9:
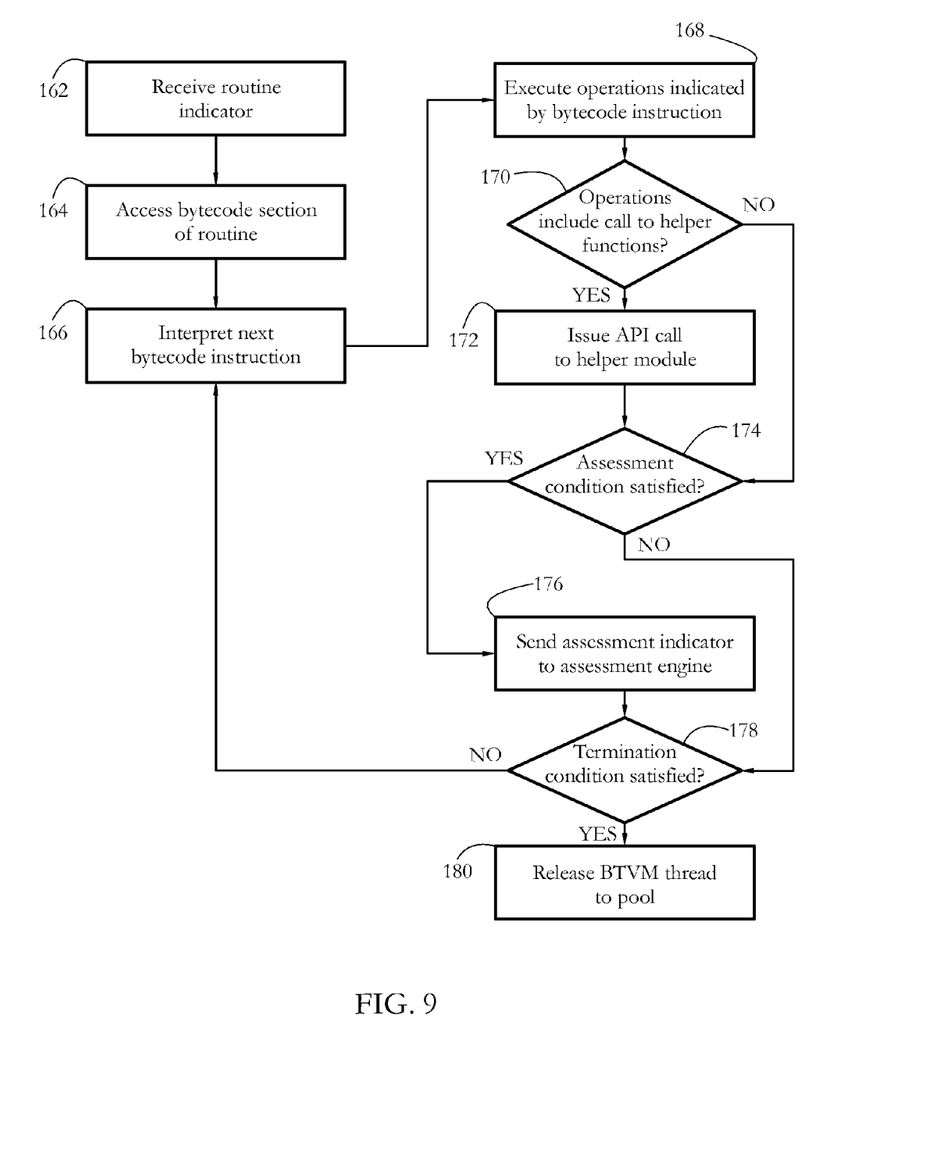
FIG. 9 shows an exemplary sequence of steps performed by the bytecode translation VM (FIG. 3) according to some embodiments of the present invention.

FIG. 9 shows an exemplary sequence of steps performed by bytecode translation virtual machine 34 when executing a bytecode routine. In some embodiments, BTVM 34 comprises a software emulation of a computer system, comprising a virtual processor, a virtual memory and a set of virtual registers. The virtual processor of BTVM 34 considers bytecode instructions as its native instruction set. However, since bytecode instructions are not native instructions of the platform that security application 40 executes on, executing bytecode instructions includes translating each bytecode instruction into a sequence of processor instructions native to the processor of the respective platform. In some embodiments, BTVM 34 comprises a code interpreter configured to interpret and execute bytecode instructions one by one. In an alternative embodiment, BTVM 34 may include a just-in-time (JIT) compiler configured to compile all instructions of a bytecode routine together into a native code routine. The compiled native code routine is then executed as a whole. In some embodiments, BTVM 34 comprises a library of functions (e.g., classes) coded in the native instruction set of processor 12, wherein each type of bytecode instruction corresponds to a distinct function of said library. In such cases, interpreting a bytecode instruction may comprise identifying the appropriate function according to the bytecode instruction, and executing the respective function. Exemplary bytecode translation virtual machines include the Java® and Lua® virtual machines, among others.

In some embodiments, the virtual memory space of BTVM 34 is divided into several regions, each region storing a distinct type of variables. Some variables may be of a LOCAL type; values of such variables may be unique to the current instance of the respective routine or bytecode section. Other variables may be of a STATIC type (dedicated to a particular routine type, shared across all code sections of a routine of that particular type, maintaining their value across multiple instances of the same routine/bytecode section). Other variables may be of a GLOBAL type (shared across all bytecode routines and instances). Some embodiments of BTVM 34 may also operate with variables of a PROCESS type—these variables may be uniquely attached to a routine-process tuple, shared across all code sections of a routine of that particular type, maintaining their value across multiple instances of the same routine/bytecode section, but different from one process to another. When the virtual memory of BTVM 34 is configured to store variables of the PROCESS type, such variables may be initialized once for every process being monitored by event interceptors 28*a-c*, and erased upon termination of the respective process.

In some embodiments, security application 40 maintains a thread pool for use by BTVM 34. In one example, the thread pool comprises the same number of threads as the count of logical CPUs of processor 12. All threads of the thread pool may be set to the same priority level. When dispatching bytecode routines, dispatcher 32 may wait for the next available thread. Distinct instances of BTVM 34 may thus run independently and concurrently, in arbitrary memory contexts. In some embodiments, instances of BTVM 34 may execute out-of-order, i.e., not necessarily in the same order in which the events that triggered them were inserted into event queue 31.

In response to receiving routine indicator 46 (e.g., a memory address of the bytecode routine) from routine dispatcher 32, BTVM 34 may access bytecode section 74. Without loss of generality, the next illustrated steps describe an embodiment wherein BTVM 34 interprets and executes each bytecode instruction in turn. A skilled artisan will appreciate that the present description may be adapted to describe the operation of an embodiment which uses just-in-time (JIT) compilation. In a sequence of steps 166-168, BTVM 34 may interpret a bytecode instruction and execute a set of operations indicated by the respective instruction.

Some bytecode instructions call for complex functionality, for instance, for functionality offered by a function of OS 30. To keep the complexity of BTVM 34 to a minimum and to reduce the attack surface of BTVM 34, some embodiments provide such functionality to BTVM 34 via an application program interface (API) embodied as helper module 36 (FIG. 3). Module 36 may comprise a set of helper functions configured to assist BTVM 34, performing tasks such as verifying the existence of a file, attempting to match a content of a memory section to a malware-indicative signature, enumerating files, and setting evaluation scores, among others. When the current bytecode instruction calls a helper function, in a step 170, bytecode translation VM 34 issues an API call 48 to helper module 36. Helper module 36 may further interface with OS 30.

In some embodiments, helper module 36 may have the functionality to add new events to event queue 31, in response to an API call from bytecode translation VM 34 (see, e.g., FIG. 3). In one such example, a first part of a bytecode routine is processed synchronously. BTVM 34 may then cause a second part of the respective routine to be executed later (in a asynchronous manner) by calling on helper module 36 to add a new event to queue 31, the new event chosen to trigger execution of the second part of the routine. In another example, the described mechanism may be used to execute a cascade of bytecode routines, wherein each routine determines execution of the next member of the cascade by instructing helper module 36 to insert a new event into event queue 31.

Some bytecode routines output an assessment indicator 50 to behavioral assessment engine 38, for instance via an API call to engine 38 or to helper module 36. Assessment indicator 50 may include evaluation scores indicative of a likelihood that a particular monitored object (e.g., process) is malicious. Another exemplary assessment indicator 50 comprises a score increment to be added to an evaluation score maintained for the respective object by assessment engine 38. Yet another exemplary indicator 50 includes a verdict (e.g., clean/malicious). In some embodiments, a sequence of steps 174-176 determines whether an assessment condition is satisfied (e.g., whether a score increment has been calculated), and when yes, transmits indicator 50 to assessment engine 38.

A step 178 may verify whether a termination condition is satisfied, and when no, BTVM 34 may advance to the next bytecode instruction of the current routine (see step 166 above). In some embodiments, step 178 may comprise determining whether the last bytecode instruction of the current routine/bytecode section has been executed. Some bytecode routines may be configured to execute for a maximum amount of time; in such cases, step 178 may determine whether the maximum allowed time period has elapsed since launching the current bytecode routine/section into execution. Another exemplary termination condition may be satisfied whenever an error occurs during execution of the respective routine/bytecode section. When the termination condition is satisfied, a step 180 may terminate the current instance of BTVM 34 and release the respective thread into the thread pool.

In some embodiments, behavioral assessment engine 38 maintains a centralized knowledgebase of monitored software entities, such as processes and threads executing on client system 10. For each such entity, engine 38 may store a filiation indicator (e.g., to indicate parent-child relationships, relationships between processes that inject code and the recipients of such code injections, etc.). Some embodiments of assessment engine 38 further store a set of evaluation scores associated to each monitored entity. Each such score may be determined according to a distinct criterion (for instance, each score is updated by a specific bytecode routine). In some embodiments, scoring engine 38 is configured to determine according to such scores whether each monitored entity poses a computer security threat. When such a threat is identified, engine 38 may take anti-malware action against the respective malicious entity, for instance to stop execution of, or otherwise to incapacitate the respective software object. Engine 38 may further alert a user of client system 10 and/or a system administrator.

The exemplary systems and methods described above allow protecting a client system against computer security threats such as malware and spyware. For each of a plurality of executable entities, such as processes and threads currently executing on the client system, a security application maintains a set of evaluation scores, which may indicate a likelihood that the respective entity poses a threat. In some embodiments, such scores are produced in response to executing a plurality of detection routines, each routine configured to evaluate a monitored entity according to criteria specific to each detection routine. Detection routines may implement various computer security heuristics; separate routines may correspond to distinct heuristics. For instance, one routine may determine whether a monitored entity performs a malware-indicative sequence of actions, known in the art as a behavioral signature. Execution of detection routines may be triggered selectively, in response to detecting the occurrence of specific trigger events.

In some embodiments of the present invention, detection routines are formulated in bytecode, i.e., using a custom set of instructions which are not readily executable by the processor of the respective client system. Instead, detection routines are executed within a bytecode translation virtual machine, which uses interpretation or just-in-time compilation techniques to translate each bytecode routine into a set of processor instructions native to the processor of the respective platform, before executing the respective instructions.

In conventional computer security systems, detection routines are typically pre-compiled into native code of the target platform, and packaged together with the rest of the components of a security application. Although such configurations allow an optimized, fast execution of the respective detection routines, they may be difficult to develop, keep up to date, and deploy to client computer systems. For example, any small change in a detection routine, or the introduction of a new detection routine/heuristic, may require a re-compilation of a large chunk of code of the security application, and the deployment of a relatively large software update (e.g., several megabytes). Moreover, a software bug in the update may potentially bring down the entire security application, so updates typically require extensive testing before being delivered to clients.

Figure 10:
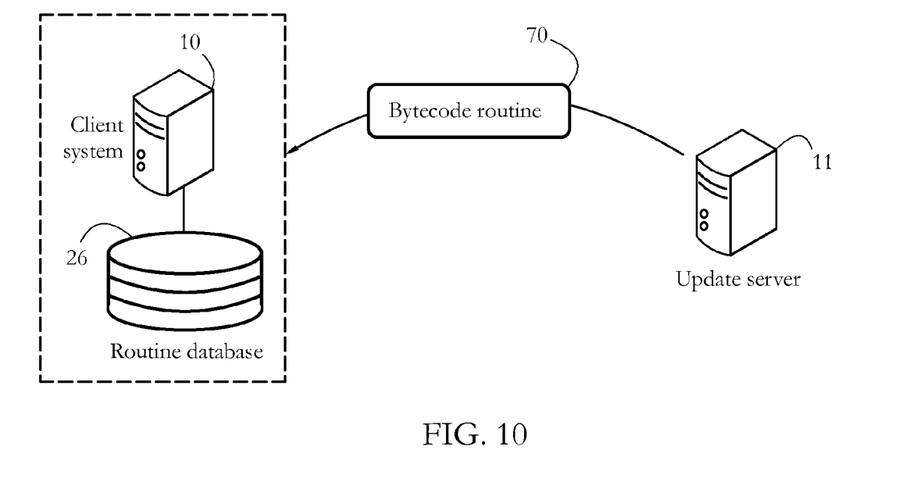
FIG. 10 illustrates an exemplary software update process according to some embodiments of the present invention.

In contrast, the use of bytecode detection routines allows some embodiments of the present invention to substantially shorten the time-to-market of the security solution, as well as to simplify the software update process. Since bytecode detection routines are interpreted or compiled on-the-fly, they may be developed and delivered to clients separately from the main components of the security solution. New detection heuristics may be developed and implemented completely independently of existing routines. As shown in FIG. 10, a software update may comprise just a set of bytecode routines 70, amounting to as little as a few hundred bytes. To activate the new detection capabilities, the respective bytecode routine(s) may be introduced into routine database 26 and subsequently registered with routine dispatcher 32. Also, since each detection routine executes within an instance of the bytecode translation virtual machine and separately from other components of the security application, an error or a software bug present within a bytecode routine is contained and less likely to affect the operation of other software.

Some embodiments of the present invention may use a widely available bytecode translation virtual machine such as the Java® or Lua® virtual machines to achieve interpretation and/or JIT compilation of detection routines. However, to minimize the architectural complexity and to reduce the attack surface of the bytecode translation virtual machine, some embodiments employ a customized translation virtual machine endowed with a minimal functionality. When more complex functionality is called for within a detection routine, some embodiments provide the required functionality through a separate helper API.

Since each instance of the bytecode translation virtual machine may execute within a separate, independent memory context, some embodiments of the present invention may offer the same security advantages as provided, for instance, by containerization. Other advantages of the present invention include portability. While some components of the proposed security solution may need to be compiled separately for each type of client device (e.g., computer system, smartphone, etc.), bytecode routines are platform-independent in the sense that identical detection routines, including updates, may be delivered to all platforms and client devices.

Such advantages of the present invention may come at the cost of memory overhead and processing speed. While pre-compiled solutions are optimized for maximum performance of a particular platform, interpretation and/or JIT compilation of detection routines may render some embodiments of the present invention slower than pre-compiled security applications.

It will be clear to one skilled in the art that the above embodiments may be altered in many ways without departing from the scope of the invention. Accordingly, the scope of the invention should be determined by the following claims and their legal equivalents.

What is claimed is:

1. A client system comprising at least one hardware processor configured to form a routine dispatcher, a bytecode translation virtual machine, and a behavioral assessment engine, wherein:
   the routine dispatcher is configured, in response to detecting an occurrence of a trigger event, to select an anti-malware bytecode routine for execution from a plurality of anti-malware bytecode routines, the anti-malware bytecode routine selected according to the trigger event, wherein the occurrence of the trigger event is caused by a monitored process executing within the client system;
   the bytecode translation virtual machine is configured to execute the anti-malware bytecode routine to determine whether the occurrence of the trigger event is indicative of malware, wherein executing the anti-malware bytecode routine comprises:
      translating a set of bytecode instructions of the anti-malware bytecode routine into a sequence of native processor instructions, and
      executing the sequence of native processor instructions; and
   the behavioral assessment engine is configured to determine whether the client system comprises malware according to a result of the bytecode translation virtual machine executing the anti-malware bytecode routine.

2. The client system of claim 1, wherein the routine dispatcher is further configured, in response to detecting the occurrence of the trigger event, to:
   determine whether a synchrony condition is satisfied according to a type of the trigger event;
   in response to determining whether the synchrony condition is satisfied, when the synchrony condition is satisfied, configure the hardware processor to suspend execution of code belonging to the monitored process until the bytecode translation virtual machine finishes executing the anti-malware bytecode routine; and
   in response to determining whether the synchrony condition is satisfied, when the synchrony condition is not satisfied, instruct the hardware processor to continue execution of code belonging to the monitored process.

3. The client system of claim 2, wherein the routine dispatcher is further configured, in response to determining whether the synchrony condition is satisfied, when the synchrony condition is not satisfied, to insert the trigger event into an event queue for later processing.

4. The client system of claim 3, wherein the routine dispatcher is further configured to:
   remove a second trigger event from the event queue;
   in response to removing the second trigger event from the event queue, select a second anti-malware bytecode routine for execution, the second anti-malware bytecode routine selected from the plurality of bytecode routines according to the second trigger event; and
   in response to selecting the second anti-malware bytecode routine, transmit an indicator of the second anti-malware bytecode routine to the bytecode translation virtual machine.

5. The client system of claim 1, wherein executing the anti-malware bytecode routine causes the hardware processor to determine whether the monitored process performed a set of actions.

6. The client system of claim 1, wherein executing the anti-malware bytecode routine causes the hardware processor to determine whether the trigger event forms a part of a malware-indicative sequence of events.

7. The client system of claim 6, wherein a selected event of the sequence of events is caused by another monitored process executing within the client system, the another monitored process distinct from the monitored process.

8. The client system of claim 1, wherein the anti-malware bytecode routine comprises an encoding of a trigger condition, and wherein selecting the anti-malware bytecode routine for execution comprises determining whether the trigger condition is satisfied.

9. The client system of claim 1, wherein the anti-malware bytecode routine comprises an encoding of a trigger condition, and wherein the bytecode translation virtual machine is further configured to select the set of bytecode instructions for translation according to a result of determining whether the trigger condition is satisfied.

10. A computer-implemented method comprising employing at least one hardware processor of a client system to perform each of the steps of:
   in response to detecting an occurrence of a trigger event, selecting an anti-malware bytecode routine from a plurality of bytecode routines according to the trigger event, the anti-malware bytecode routine configured to determine whether the occurrence of the trigger event is indicative of malware, wherein the trigger event is caused by a monitored process executing within the client system;

in response to selecting the anti-malware bytecode routine, translating a set of bytecode instructions of the anti-malware bytecode routine into a sequence of native processor instructions;
executing the sequence of native processor instructions; and
determining whether the client system comprises malware according to a result of executing the sequence of native processor instructions.

11. The method of claim 10, further comprising, in response to detecting the occurrence of the trigger event:
employing the at least one hardware processor to determine whether a synchrony condition is satisfied according to a type of the trigger event;
in response to determining whether the synchrony condition is satisfied, when the synchrony condition is satisfied, configuring the at least one hardware processor to suspend execution of code belonging to the monitored process until the sequence of native processor instructions finishes executing; and
in response to determining whether the synchrony condition is satisfied, when the synchrony condition is not satisfied, employing the at least one hardware processor to continue execution of code belonging to the monitored process.

12. The method of claim 11, further comprising, in response to determining whether the synchrony condition is satisfied, when the synchrony condition is not satisfied, employing the at least one hardware processor to insert the trigger event into an event queue for later processing.

13. The method of claim 12, further comprising:
employing the at least one hardware processor to remove a second trigger event from the event queue;
in response to removing the second trigger event from the event queue, employing the at least one hardware processor to select a second anti-malware bytecode routine for execution, the second anti-malware bytecode routine selected from the plurality of bytecode routines according to the second trigger event;
in response to selecting the second anti-malware bytecode routine, employing the at least one hardware processor to translate a set of bytecode instructions of the second anti-malware bytecode routine into a second sequence of native processor instructions; and
employing the at least one hardware processor to execute the second sequence of native processor instructions.

14. The method of claim 10, wherein executing the sequence of native processor instructions causes the at least one hardware processor to determine whether the monitored process performed a set of actions.

15. The method of claim 10, wherein executing the sequence of native processor instructions causes the at least one hardware processor to determine whether the trigger event forms a part of a malware-indicative sequence of events.

16. The method of claim 15, wherein a selected event of the sequence of events is caused by another monitored process executing within the client system, the another monitored process distinct from the monitored process.

17. The method of claim 10, wherein the anti-malware bytecode routine comprises an encoding of a trigger condition, and wherein selecting the anti-malware bytecode routine for execution comprises determining whether the trigger condition is satisfied.

18. The method of claim 10, wherein the anti-malware bytecode routine comprises an encoding of a trigger condition, the method further comprising:
determining whether the trigger condition is satisfied; and
in response, selecting the set of bytecode instructions for translation according to a result of determining whether the trigger condition is satisfied.

19. A non-transitory computer readable medium storing a computer program which, when executed by at least one hardware processor of a client system, cause the client system to form a routine dispatcher, a bytecode translation virtual machine, and a behavioral assessment engine, wherein:
the routine dispatcher is configured, in response to detecting an occurrence of a trigger event, to select an anti-malware bytecode routine for execution from a plurality of anti-malware bytecode routines according to the trigger event, the anti-malware bytecode routine configured to determine whether the occurrence of the trigger event is indicative of malware, wherein the trigger event is caused by a monitored process executing within the client system;
the bytecode translation virtual machine is configured to execute the anti-malware bytecode routine, wherein executing the anti-malware bytecode routine comprises:
translating a set of bytecode instructions of the anti-malware bytecode routine into a sequence of native processor instructions, and
executing the sequence of native processor instructions; and
the behavioral assessment engine is configured to determine whether the client system comprises malware according to a result of the bytecode translation virtual machine executing the anti-malware bytecode routine.

20. A non-transitory computer readable medium storing an anti-malware bytecode routine, the anti-malware bytecode routine executable by a bytecode translation virtual machine formed on a client system comprising at least one hardware processor, wherein executing the anti-malware bytecode routine causes the at least one hardware processor to determine whether an occurrence of a trigger event within the client system is indicative of malware, wherein executing the anti-malware bytecode routine comprises:
translating a set of bytecode instructions of the anti-malware bytecode routine into a sequence of native processor instructions; and
executing the sequence of native processor instructions, wherein the client system further comprises a routine dispatcher and a behavioral assessment engine, wherein:
the routine dispatcher is configured, in response to detecting the occurrence of the trigger event, to select the anti-malware bytecode routine from the plurality of bytecode routines according to the trigger event; and wherein
the behavioral assessment engine is configured to determine whether the client system comprises malware according to a result of the bytecode translation virtual machine executing the anti-malware bytecode routine.

* * * * *